Patented Feb. 9, 1954

2,668,768

UNITED STATES PATENT OFFICE 2,668,768

STABILIZATION OF EDIBLE FATS AND OILS

Joseph A. Chenicek, Bensenville, Ill., assignor to Universal Oil Products Company, Chicago, Ill., a corporation of Delaware No Drawing. Application October 17, 1949, Serial No. 121,906

9 Claims. (Cl. 99—163)

This invention relates to the stabilization of edible fats and oils and more particularly to a novel method of inhibiting the development of rancidity therein.

The edible fats and oils which may be stabilized in accordance with the present invention are generally of animal, marine and vegetable origin. Merely as typical representatives, the following are mentioned: linseed oil, menhaden oil, cod liver oil, castor oil, olive oil, rapeseed oil, coconut oil, palm oil, corn oil, sesame oil, peanut oil, babassu oil, butter, fat, lard, beef tallow, etc., as well as hydrogenated oils and fats which are sold under various trade names. It is understood that other oils and fats may be treated within the scope of the present invention, including fats and oils which previously have been subjected to various treatments, such as blowing with air, heat treatment, etc.

In accordance with the present invention, the edible fats and oils are stabilized by the addition of a novel inhibitor. Satisfactory inhibitors for edible fats and oils must meet certain strict requirements. In the first place, the inhibitor must be potent in order to sufficiently prevent or retard rancidity development. Extensive investigations have shown that there is no prediction of potency in edible fats and oils based upon prior effectiveness in other organic substances. Conversely, inhibitors which are satisfactory for use in edible fats and oils may not be satisfactory for use in other organic substances.

Further, satisfactory inhibitors for edible fats and oils must be non-toxic, must not impart undesirable color, odor or taste to the fats and oils, and must not be so volatile that they are removed from the fats and oils during cooking or in deep fat frying. In addition, the inhibitor must be readily soluble in edible fats and oils in order to be satisfactorily incorporated therein.

In one embodiment the present invention relates to a method of stabilizing edible fats and oils against rancidity which comprises incorporating therein a phenolic compound having at least one ring hydrogen substituted by an alkylthioalkyl group.

In a specific embodiment the present invention relates to a method of stabilizing lard which comprises adding thereto from about 0.001% to about 0.5% by weight of a phenolic compound having at least one ring hydrogen substituted by an alkylthiomethyl group.

In another specific embodiment the present invention relates to novel compositions of matter comprising an edible fat and oil and particularly lard containing a phenolic compound having at least one of its ring hydrogens substituted by an alkylthioalkyl group and particularly an alkylthiomethyl group.

It also has been discovered that the novel inhibitor of the present invention, when used along with other known oxidation inhibitors, will stabilize edible fats and oils far in excess of that normally expected on the basis of an additive effect. This phenomenon has been termed "synergism" and compounds functioning in this manner are called "synergists" and are said to have a "synergistic effect."

Particular advantages to the use of a synergist along with a known oxidation inhibitor is that it permits the use of a smaller amount of total additive in order to obtain equal stability times, as compared to the use of only the oxidation inhibitor. On the other hand, when using the same amount of known oxidation inhibitor, the use of a synergist in conjunction therewith will give a considerably longer stability time.

Thus, in another embodiment the present invention relates to a method of stabilizing edible fats and oils which comprises incorporating therein an oxidation inhibitor and a synergist comprising a phenolic compound having at least one ring hydrogen substituted by an alkylthioalkyl group.

In another specific embodiment the present invention relates to a method of stabilizing lard which comprises adding thereto an oxidation inhibitor and a synergist comprising a phenolic compound having at least one ring hydrogen substituted by an alkylthiomethyl group.

In still another specific embodiment the present invention relates to a novel composition of matter comprising an edible fat and oil and particularly lard containing an oxidation inhibitor and a synergist comprising a phenolic compound having at least one ring hydrogen substituted by an alkylthioalkyl group and particularly an alkylthiomethyl group.

The novel inhibitor or synergist of the present invention may be illustrated by the following general formula:

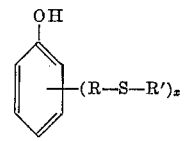

where R is a hydrocarbon radical and preferably a methylene group, S is sulfur, R' is selected from the group consisting of alkyl, cycloalkyl, aryl, aralkyl and alkaryl, and $x$ is an integer of one or more and preferably 1, 2, 3 or 4.

Where R is methylene and R' is an alkyl radical, preferred compounds include 2-methylthiomethyl phenol, 2-ethylthiomethyl phenol, 2-propylthiomethyl phenol, 2-butylthiomethyl phenol, 2-amylthiomethyl phenol, 2-hexylthiomethyl phenol, 2-heptylthiomethyl phenol, 2-octylthiomethyl phenol, etc., 4-methylthiomethyl phenol, 4-ethylthiomethyl phenol, 4-propylthiomethyl phenol, 4-butylthiomethyl phenol, 4-amylthiomethyl phenol, 4-hexylthiomethyl phenol, 4-heptylthiomethyl phenol, 4-octylthiomethyl phenol, etc., 2,4-di-(methylthiomethyl)-phenol, 2,4-di-(ethylthiomethyl)-phenol, 2,4-di-(propylthiomethyl)-phenol, 2,4-di-(butylthiomethyl)-phenol, 2,4-di-(amylthiomethyl)-phenol, 2,4-di(hexylthiomethyl)-phenol, etc., 2,6-di-(methylthiomethyl)-phenol, 2,6-di-(ethylthiomethyl)-phenol, 2,6-di-(propylthiomethyl)-phenol, 2,6-di-(butylthiomethyl)-phenol, 2,6-di-(amylthiomethyl)-phenol, 2,6-di-(hexylthiomethyl)-phenol, etc., 2,4,6-tri-(methylthiomethyl)-phenol, 2,4,6-tri-(ethylthiomethyl)-phenol, 2,4,6-tri-(propylthiomethyl)-phenol, 2,4,6-tri-(butylthiomethyl)-phenol, 2,4,6-tri-(amylthiomethyl)-phenol, etc.

Where R' in the above formula is a cycloalkyl group, the inhibitors or synergists will comprise a cycloalkylthioalkyl phenol including 2-cyclohexylthiomethyl phenol, 4-cyclohexylthiomethyl phenol, etc., 2,4-di-(cyclohexylthiomethyl)-phenol, etc., 2,6-di-(cyclohexylthiomethyl)-phenol, etc. It is understood that, when desired, three cycloalkylthioalkyl groups may be attached to the phenolic compound.

Where R' in the above formula comprises an aryl group the inhibitor or synergist will include compounds as 2-phenylthiomethyl phenol, 2-naphthylthiomethyl phenol, 4-phenylthiomethyl phenol, 4-naphthylthiomethyl phenol, etc. Where R' is an aralkyl group the inhibitor or synergist will include such compounds as 2-benzylthiomethyl phenol, 2-phenylethylthiomethyl phenol, 2-phenylpropylthiomethyl phenol, 2-phenylbutylthiomethyl phenol, 2-phenylamylthiomethyl phenol, 4-benzylthiomethyl phenol, 4-phenylethylthiomethyl phenol, 4-phenylpropylthiomethyl phenol, 4-phenylbutylthiomethyl phenol, 4-phenylamylthiomethyl phenol, etc. Where R' is an alkaryl group the inhibitor or synergist includes such compounds as 2-tolylthiomethyl phenol, 2-ethylphenylthiomethyl phenol, 2-propylphenylthiomethyl phenol, 2-butylphenylthiomethyl phenol, 2-amylphenylthiomethyl phenol, 4-tolylthiomethyl phenol, 4-ethylphenylthiomethyl phenol, 4-propylphenylthiomethyl phenol, 4-butylphenylthiomethyl phenol, 4-amylphenylthiomethyl phenol, etc. It is understood that two or more of the aryl, aralkyl and/or alkarylthiomethyl groups may be attached to the phenolic compound.

Other preferred inhibitors and synergists comprise compounds containing at least one alkylthioalkyl substituent and at least one alkyl substituent replacing ring hydrogens of the phenolic compound. Particularly satisfactory compounds in this class include 2-alkyl-4-alkylthioalkyl phenols and still more particularly 2-tert-butyl-4-methylthiomethyl phenol, 2-tert-amyl-4-methylthiomethyl phenol, 2-tert-hexyl-4-methylthiomethyl phenol, 2-tert-butyl-4-ethylthiomethyl phenol, 2-tert-amyl-4-ethylthiomethyl phenol, 2-tert-hexyl-4-ethylthiomethyl phenol, 2-tert-butyl-4-propylthiomethyl phenol, 2-tert-amyl-4-propylthiomethyl phenol, 2-tert-hexyl-4-propylthiomethyl phenol, 2-tert-butyl-4-butylthiomethyl phenol, 2-tert-amyl-4-butylthiomethyl phenol, 2-tert-hexyl-4-butylthiomethyl phenol, 2-tert-butyl-4-amylthiomethyl phenol, 2-tert-amyl-4-amylthiomethyl phenol, 2-tert-hexyl-4-amylthiomethyl phenol, 2-ethylthiomethyl-4-tert-butyl phenol, 2-propylthiomethyl-4-tert-butyl phenol, 2-butylthiomethyl-4-tert-butyl phenol, 2-amylthiomethyl-4-tert-butyl phenol, 2-ethylthiomethyl-4-tert-amyl phenol, 2-propylthiomethyl-4-tert-amyl phenol, 2-butylthiomethyl-4-tert-amyl phenol, 2-amylthiomethyl-4-tert-amyl phenol, 2-ethylthiomethyl-4-tert-hexyl phenol, 2-propylthiomethyl-4-tert-hexyl phenol, 2-butylthiomethyl-4-tert-hexyl phenol, 2-amylthiomethyl-4-tert-hexyl phenol, 2,4-di-tert-butyl-6-ethylthiomethyl phenol, 2,4-di-tert-amyl-6-ethylthiomethyl phenol, 2,4-di-tert-hexyl-6-ethylthiomethyl phenol, 2,4-di-tert-butyl-6-propylthiomethyl phenol, 2,4-di-tert-amyl-6-propylthiomethyl phenol, 2,4-di-tert-hexyl-6-propylthiomethyl phenol, 2,4-di-tert-butyl-6-butylthiomethyl phenol, 2,4-di-tert-amyl-6-butylthiomethyl phenol, 2,4-di-tert-hexyl-6-butylthiomethyl phenol, 2,4-di-tert-butyl-6-amylthiomethyl phenol, 2,4-di-tert-amyl-6-amylthiomethyl phenol, 2,4-di-tert-hexyl-6-amylthiomethyl phenol, 2,6-di-tert-butyl-4-ethylthiomethyl phenol, 2,6-di-tert-amyl-4-ethylthiomethyl phenol, 2,6-di-tert-hexyl-4-ethylthiomethyl phenol, 2,6-di-tert-butyl-4-propylthiomethyl phenol, 2,6-di-tert-amyl-4-propylthiomethyl phenol, 2,6-di-tert-hexyl-4-propylthiomethyl phenol, 2,6-di-tert-butyl-4-butylthiomethyl phenol, 2,6-di-tert-amyl-4-butylthiomethyl phenol, 2,6-di-tert-hexyl-4-butylthiomethyl phenol, 2,6-di-tert-butyl-4-amylthiomethyl phenol, 2,6-di-tert-amyl-4-amylthiomethyl phenol, 2,6-di-tert-hexyl-4-amylthiomethyl phenol, etc.

Still other preferred inhibitors comprise 4-alkoxyphenols containing at least one alkylthioalkyl substituent and which also may or may not contain at least one alkyl substituent. Satisfactory inhibitors or synergists in this class include 2-alkylthiomethyl-4-alkoxyphenols in which the alkyl group is selected from methyl, ethyl, propyl, butyl, amyl, hexyl, heptyl, octyl, etc. and the alkoxy group is selected from methoxy, ethoxy, propoxy, butyoxy, etc. Other satisfactory inhibitors in this class include 2-alkylthioalkyl-4-alkoxy-6-tert-alkylphenols in which the alkyl radicals of the alkyl radical of the alkoxy group is selected from groups hereinbefore set forth, and the tert-alkyl group is selected from tert-butyl, tert-amyl, tert-hexyl, tert-heptyl, tert-octyl, etc. Particularly preferred compounds of this class include 2-tert-butylthiomethyl-4-methoxyphenol, 2-tert-butylthiomethyl-4-ethoxyphenol, 2-tert-amylthiomethyl-4-methoxyphenol, 2-tert-amylthiomethyl-4-ethoxyphenol, etc.

The alkylthioalkyl-4-methoxyphenols are believed to be new compounds and, therefore, are being so claimed in the present application.

It is understood that various compounds may be prepared and used in accordance with the present invention and that all of these compounds are not necessarily equivalent. However, all of these compounds will have potency as an inhibitor and synergist when used in the stabilization of edible fats and oils.

The inhibitor or synergist compounds of the present invention may be prepared in any suitable manner. In one method of preparation, the desired phenol, alkyl phenol, alkoxyphenol or alkylakoxyphenol is reacted with formaldehyde or trioxymethylene and the desired mercaptan. This reaction is readily effected by refluxing the mixture in the presence of a suitable solvent such as benzene, toluene, xylene, etc. After the reaction is completed, water formed during the reaction and the aromatic solvent are removed by distillation, preferably in separate steps, and the product is finally purified by distillation under vacuum.

In another method of preparation, a suitable dimethyl amine derivative of the phenol alkylphenol or alkoxyphenol is reacted with the desired mercaptan, again by refluxing the mixture until the reaction is completed. Unreacted mercaptan and alkyl amine are removed by distillation, and the product may be further distilled under vacuum for final purification.

When used as an inhibitor, the compound of the present invention may be added to edible fats and oils in amounts of less than 1% by weight and generally within a range of from about 0.001% to about 0.5% by weight. It is understood that the inhibitor may be used in conjunction with synergists such as phosphoric acid, ascorbic acid, etc.

When used as a synergist along with other oxidation inhibitors, the compound will generally be used in smaller amounts which may range from about 0.0001% to about 0.05%. Suitable known oxidation inhibitors include propyl gallate, 2-tert-butyl-4-methoxyphenol, 1,7-dihydroxynaphthalene, N. D. G. A. (Nordihydroguaretic acid), etc. The oxidation inhibitor generally will be employed in an amount within the range of from about 0.0001% to about 0.5% by weight.

The following examples are introduced to illustrate further the novelty and utility of the present invention but not with the intention of unduly limiting the same.

The inhibitors used in the following examples were added to lard which had a stability period of 2½ hours. The synergists were added to a lard which had a stability period of 16 hours. The stability periods were determined by the Swift test which is described in detail by A. E. King, H. L. Roschen and W. H. Irwin in an article which appeared in the Oil and Soap, vol. X, No. 6, pages 105 to 109 (1933). In general, this test comprises bubbling air through a sample of the lard and reporting the number of hours until the lard develops a peroxide value of 20.

EXAMPLE I 2-tert-amyl-4-n-butylthiomethylphenol was prepared by the reaction of 2-tert-amyl-4-dimethylaminomethyl phenol with normal butyl mercaptan. When this compound was added in an amount of 0.02% by weight to the lard having a normal stability period of 2½ hours, it served to increase the stability period thereof to about 30 hours.

EXAMPLE II 2,6-di-n-butylthiomethyl-4-methylphenol was prepared by the reaction of 2,6-dimethylaminomethyl-4-methylphenol with n-butyl mercaptan. When this product was added in an amount of 0.02% by weight to the lard, it served to increase the stability period thereof from 2½ hours to about 68 hours.

EXAMPLE III 2-n-butylthiomethyl-4-methoxyphenol was prepared by the reaction of 2-di-methylaminomethyl-4-methoxyphenol with n-butyl mercaptan. When this compound was added to the lard, in an amount of 0.02% by weight, it served to increase the stability time thereof to about 32 hours.

EXAMPLE IV 2-tert-amylthiomethyl-4-methoxyphenol was prepared by the reaction of 4-methoxyphenol with trioxymethylene and tert-amyl mercaptan. When this product was added to the lard in an amount of 0.02% by weight, it served to increase the stability time thereof to about 29 hours.

EXAMPLE V 2-tert-butyl-6-tetrt-amylthiomethyl-4-methoxyphenol was prepared by the reaction of 2-tert-butyl-4-methoxyphenol with trioxymethylene and tert-amyl mercaptan. When this product was added to the lard in an amount of 0.02% by weight, it served to increase the stability time thereof to about 30 hours.

In all of the prior examples, it will be noted that the compounds of the present invention served to considerably increase the stability time of the lard. The following examples illustrate the effectiveness of these compounds as a synergist when used in conjunction with other oxidation inhibitors. As hereinbefore set forth, these tests were made with a lard which had a normal stability period of 16 hours and both the synergist and the oxidation inhibitor were each used in amount of 0.0025% by weight.

EXAMPLE VI

The following table shows the stability time obtained with the oxidation inhibitors and the synergists when added separately in an amount of 0.005% by weight to the lard. These results may be considered as the blank or control data to be used for comparison with the results obtained by utilizing both the oxidation inhibitor and the synergist, each in an amount of 0.0025% in order to obtain a total additive concentration of 0.005% by weight of the lard.

*Table I*

| Additive (0.005%) | Stability Time (Hours) |
|---|---|
| None | 16 |
| Oxidation Inhibitor: | |
| 2-tert-butyl-4-methoxyphenol | 32 |
| propyl gallate | 37 |
| 1,7-dihydroxynaphthalene | 34 |
| N. D. G. A | 33 |
| Synergist: | |
| 2,6-di-n-butylthiomethyl-4-methylphenol | 22.5 |
| 2-n-butylthiomethyl-4-methoxyphenol | 18 |

EXAMPLE VII

The synergist used in this example is 2,6-di-n-butylthiomethyl-4-methylphenol and was prepared in the manner hereinbefore set forth. The oxidation inhibitors used in this example are 2-tert-butyl-4-methoxyphenol, propyl gallate, 1,7-dihydroxynaphthalene and N. D. G. A. The synergistic effect of the 2,6-di-n-butylthiomethyl-4-methylphenol is shown by the data in the following table:

*Table II*

| 0.0025% of 2,6-di-n-butyl-thiomethyl-4-methyl-phenol with 0.0025% of— | Stability Time (Hours) | | | |
|---|---|---|---|---|
| | Actual | Actual Increase | Expected Increase | Difference |
| Propyl gallate | 41 | 25 | 14 | 11 |
| 1,7-dihydroxynaphthalene | 50 | 24 | 12 | 12 |
| N. D. G. A | 43 | 27 | 12 | 13 |
| 2-tert-butyl-4-methoxyphenol | 35 | 19 | 11 | 8 |

The expected increase is computed on the basis of ½ of the actual increase in stability time obtained with 0.005% of the additives in view of the fact that only ½ as much of each additive was utilized. For example, with reference to the test employing the synergist and propyl gallate, it will be noted that propyl gallate alone (0.005% concentration) gave 37 hours (Example VI) which is an increase of 21 hours over the 16 hours stability period of the uninhibited lard. Similarly, the synergist alone (0.005% concentration) gave a stability time of 22½ hours which is an increase of 6½ hours over the uninhibited stability period of the lard. One half of 21 equals 10½ and ½ of 6½ equals 3.25 which together gives an expected increase of approximately 14 hours as shown in the above table. It will be noted that the synergist along with the oxidation inhibitors gave stability time in excess of that calculated or expected by the sum total effect of each of the additives.

EXAMPLE VIII

The synergist used in this example is 2-n-butyl-thiomethyl-4-methoxyphenol which was prepared in the manner hereinbefore set forth. The data in the following table show the synergistic effect of the compound when used in conjunction with the other oxidation inhibitors.

Table III

| 0.0025% of 2-n-butylthio-methyl-4-methoxyphenol with 0.0025% of— | Stability Time (Hours) | | | |
|---|---|---|---|---|
| | Actual | Actual Increase | Expected Increase | Difference |
| Propyl gallate | 45 | 29 | 11.5 | 17.5 |
| 1,7-dihydroxynaphthalene | 50 | 34 | 10 | 24 |
| N. D. G. A. | 51 | 34 | 9½ | 24½ |
| 2-tert-butyl-4-methoxyphenol | 41 | 25 | 9 | 16 |

Here again it will be noted that the compound of the present invention served as a very effective synergist to produce stability periods considerably in excess of that expected by the additive effect of the added compounds.

I claim as my invention:

1. A method of stabilizing edible fats and oils against rancidity which comprises adding thereto a 4-alkoxyphenol having at least one ring hydrogen substituted by an alkylthioalkyl group.

2. A method of stabilizing edible fats and oils against rancidity which comprises adding thereto a 4-alkoxyphenol having at least one ring hydrogen substituted by an alkylthiomethyl group.

3. A method of stabilizing edible fats and oils against rancidity which comprises adding thereto an oxidation inhibitor and a synergist therefor comprising a 4-alkoxyphenol having at least one ring hydrogen substituted by an alkylthioalkyl group.

4. An edible fat or oil normally tending to become rancid containing, in an amount sufficient to retard rancidity development, a 4-alkoxyphenol having at least one ring hydrogen substituted by an alkylthioalkyl group.

5. An edible fat or oil normally tending to become rancid containing an oxidation inhibitor and a synergist therefore comprising a 4-alkoxyphenol having at least one ring hydrogen substituted by an alkylthioalkyl group.

6. A method for improving the effectiveness of an oxidation inhibitor when added to lard which comprises also adding thereto from about 0.0001% to about 0.05% by weight of 2-n-butylthiomethyl-4-methoxyphenol.

7. A fatty material normally tending to become rancid containing an oxidation inhibitor selected from the group consisting of propyl gallate, 2-tert-butyl-4-methoxyphenol, 1,7-dihydroxynaphthalene and nordihydroguaiaretic acid, said fatty material additionally containing, as a synergist for the inhibitor, a 4-alkoxyphenol having at least one ring hydrogen substituted by an alkylthioalkyl group.

8. A stabilizing composition comprising 2-n-butylthiomethyl-4-methoxyphenol and an oxidation inhibitor selected from the group consisting of propyl gallate, 2-tert-butyl-4-methoxyphenol, 1,7-dihydroxynaphthalene and nordihydroguaiaretic acid.

9. A stabilizing composition comprising a 4-alkoxyphenol having at least one ring hydrogen substituted by an alkylthioalkyl group and an oxidation inhibitor selected from the group consisting of propyl gallate, 2-tert-butyl-4-methoxyphenol, 1,7-dihydroxynaphthalene and nordihydroguaiaretic acid.

JOSEPH A. CHENICEK.

References Cited in the file of this patent

UNITED STATES PATENTS

| Number | Name | Date |
|---|---|---|
| 2,124,749 | Salzberg | July 26, 1938 |
| 2,417,118 | McCleary et al. | Mar. 11, 1947 |
| 2,526,755 | Kluge et al. | Oct. 24, 1950 |

OTHER REFERENCES

Kraybill et al.: Studies on Antioxidants, Bull. 2, April 1948, Am. Meat Inst. Fond., Chicago, pages 2 and 3.